US012601323B2

(12) United States Patent
Lin et al.

(10) Patent No.: US 12,601,323 B2
(45) **Date of Patent: *Apr. 14, 2026**

(54) ONSHORE WIND TURBINE GENERATOR SET HAVING A COMPRESSED ENERGY STORAGE SYSTEM

(71) Applicants:CHINA THREE GORGES CORPORATION, Wuhan (CN); THREE GORGES GROUP INDUSTRIAL DEVELOPMENT (BEIJING) CO., LTD, Beijing (CN)

(72) Inventors: Zhihua Lin, Wuhan (CN); Ningning Xie, Wuhan (CN); Xinxing Lin, Wuhan (CN); Shengyuan Zhong, Wuhan (CN); Zhimei Zheng, Wuhan (CN)

(73) Assignees: CHINA THREE GORGES CORPORATION (CN); THREE GORGES GROUP INDUSTRIAL DEVELOPMENT (BEIJING) CO., LTD (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,636

(22) Filed: May 21, 2024

(65) Prior Publication Data

US 2024/0392749 A1 Nov. 28, 2024

(30) Foreign Application Priority Data

May 22, 2023 (CN) .......................... 202310579883.5

(51) Int. Cl.
| | |
|---|---|
| *F03D 9/17* | (2016.01) |
| *F03D 9/25* | (2016.01) |
| *F03D 13/20* | (2016.01) |

(52) U.S. Cl.
CPC ................. *F03D 9/17* (2016.05); *F03D 9/25* (2016.05); *F03D 13/201* (2023.08); *F05B 2220/706* (2013.01); *F05B 2260/422* (2020.08)

(58) Field of Classification Search
CPC . F03D 9/17; F03D 13/201; F03D 9/28; F03D 15/00; F03D 9/11; F03D 9/18;
(Continued)

(56) References Cited

U.S. PATENT DOCUMENTS

| | | | | |
|---|---|---|---|---|
| 2,539,862 A | * | 1/1951 | Rushing .................... | F03D 9/17 192/105 R |
| 4,229,661 A | * | 10/1980 | Mead ........................ | F03D 9/32 290/55 |

(Continued)

FOREIGN PATENT DOCUMENTS

| | | | | |
|---|---|---|---|---|
| CN | 202310579883.5 | 5/2023 | | |
| EP | 1783364 A2 | * 5/2007 | .............. | F03D 9/17 |

(Continued)

*Primary Examiner* — Charles Reid, Jr.

(57) ABSTRACT

Provided is an onshore wind turbine generator set having a compressed energy storage system, the set includes a wind turbine generator set, an air compressor set, an air expander set and a motor generator which are provided in a wind turbine generator compartment, and a combined air storage device provided outside the wind turbine generator compartment; the motor generator has a first input shaft and a first output shaft, the first input shaft is connected to the wind turbine generator set by a first clutch, and the first output shaft is connected to the air compressor set; the combined air storage device includes a first air storage device provided in a tower barrel and a second air storage device provided underground, and the inner cavity of the first air storage device is in connection with the inner cavity of the second air storage device.

16 Claims, 8 Drawing Sheets

(58) Field of Classification Search
CPC .... F03D 80/00; F05B 2260/422; Y02E 10/72;
Y02E 60/16; Y02E 70/30
USPC ..................................................... 290/44, 55
See application file for complete search history.

(56) References Cited

U.S. PATENT DOCUMENTS

| | | | | | |
|---|---|---|---|---|---|
| 5,537,822 | A | * | 7/1996 | Shnaid | F02C 6/16 |
| | | | | | 60/659 |
| 2006/0266037 | A1 | * | 11/2006 | Ingersoll | F03D 9/17 |
| | | | | | 60/641.1 |
| 2007/0095069 | A1 | * | 5/2007 | Joshi | F02C 6/16 |
| | | | | | 60/727 |
| 2011/0070031 | A1 | * | 3/2011 | Frazier | E02D 29/10 |
| | | | | | 405/210 |
| 2011/0233934 | A1 | * | 9/2011 | Crane | F03D 15/10 |
| | | | | | 290/55 |
| 2012/0119514 | A1 | * | 5/2012 | Crane | F03D 9/25 |
| | | | | | 290/1 R |
| 2012/0305411 | A1 | * | 12/2012 | Elazari-Volcani | B65D 88/78 |
| | | | | | 206/0.6 |
| 2018/0180019 | A1 | * | 6/2018 | Jiang | H02J 15/006 |
| 2020/0263830 | A1 | * | 8/2020 | Stradiotto | F02C 7/143 |

FOREIGN PATENT DOCUMENTS

| | | | | | |
|---|---|---|---|---|---|
| WO | WO-2012009584 | A1 | * | 1/2012 | ............... F03D 9/25 |
| WO | WO-2017117414 | A1 | * | 7/2017 | ............... F03D 9/28 |

* cited by examiner

ONSHORE WIND TURBINE GENERATOR SET HAVING A COMPRESSED ENERGY STORAGE SYSTEM

TECHNICAL FIELD

The present invention relates to the technical field of wind turbine storage, in particular to an onshore wind turbine generator set having a compressed energy storage system.

BACKGROUND

The large-scale compressed air energy storage technology is a key technology for solving the problems of wind and solar power curtailment, significantly improving the new energy integration level, and promoting the transition of primary energy sources from fossil fuels to renewable energy, so as to achieve distributed energy systems, regional-level smart microgrids, and friendly source-grid-load-storage.

An onshore wind turbine is indirectly coupled to a compressed air energy storage system to adjust and respond to the "peak clipping and valley filling" of a power grid; a wind power plant and the compressed air energy storage system are respectively connected to the power grid; and the "source-grid-load-storage" connection mode is only achieved by the "grid", and the system structure is not compact, the efficiency is not high, the space utilization rate is low, and the construction costs of an onshore wind power sub-system, an energy storage sub-system and a source-grid-load-storage large system are high.

Currently, air storage devices in which an onshore wind turbine generator set is indirectly coupled to a compressed air energy storage system has relatively high costs and a relatively low energy capacity and density, including underground cavities and a ground air storage device. Such air storage manners require remote power transmission and distribution, and have high construction costs and power transmission and distribution costs. In addition, underground caverns include salt caverns, underground aquifers, hard rock formations caverns, natural salt rock caverns, waste natural gas or petroleum gas storage chambers, and are limited by geographical conditions.

SUMMARY

In view of this, the present invention provides an onshore wind turbine generator set having a compressed energy storage system, so as to solve at least one of the following technical problems: an onshore wind turbine generator set is indirectly coupled to a compressed air energy storage system, such that the structure is not compact and construction costs are high; and the air storage device of the compressed air energy storage system has high costs.

The present invention provides an onshore wind turbine generator set having a compressed energy storage system, including a wind turbine generator set, an air compressor set, an air expander set and a motor generator which are provided in a wind turbine generator compartment, and a combined air storage device provided outside the wind turbine generator compartment; the motor generator has a first input shaft and a first output shaft, the first input shaft is connected to the wind turbine generator set by means of a first clutch, and the first output shaft is connected to the air compressor set; the combined air storage device includes a first air storage device provided in a tower barrel and a second air storage device provided underground, the inner cavity of the first air storage device is in connection with the inner cavity of the second air storage device, an input end of the combined air storage device is connected to the air compressor set, and an output end of the combined air storage device is connected to the air expander set.

The onshore wind turbine generator set provided by the examples of the present invention has the following advantages:

1. an air compressor set and an air expander set of a compressed air energy storage system are directly embedded into a wind turbine generator compartment of the onshore wind turbine generator set, so that the onshore wind turbine generator set and the compressed air energy storage system are directly coupled, the structure is compact, the occupied space is small, and construction costs of the onshore wind turbine generator set and the compressed air energy storage system are reduced.

2. The air compressor set and the wind turbine generator set are coupled by means of a motor generator and a first clutch, the power supply of the motor generator can be a power grid supply and may also be a power supply of a wind turbine generator set, so that a "source-grid-load-storage" connection mode is not only implemented by means of a "grid", and the compressed air energy storage system may be directly coupled to a wind power plant power supply at a source side nearby, implementing the distributed energy storage and regional micro-grid, and reducing the costs of power transmission and distribution by being close to a load center. The air compressor set is driven by a motor generator, and the motor generator is powered by a grid power supply or a wind power plant power supply, and is implemented by controlling the on-off of a first clutch depending on power grid requirements.

3. In a compressed air energy storage system, a first air storage device is provided by means of combined air storage, i.e. by using a pipeline steel storage tank structure of a tower barrel itself, a second air storage device is provided underground, and the first air storage device is combined with the second air storage device so as to improve the energy storage capacity and density after coupling. Compared with the traditional manner of using underground caverns, this manner is not limited by geographical conditions, shortening a power transmission distance, and reducing construction costs and power transmission costs. The air storage capacities of the first air storage device and the second air storage device can be rationally configured according to different energy storage requirements.

As an optional embodiment, a tower barrel comprises a plurality of tower barrel segments connected in an axial direction, and the first air storage device is provided in at least one tower barrel segment, or the first air storage device is at least one tower barrel segment.

As an optional embodiment, the tower barrel comprises an outer barrel body and an inner barrel body which are sheathed, the first air storage device is provided in a cavity between the outer barrel body and the inner barrel body, or the cavity between the outer barrel body and the inner barrel body serves as the first air storage device.

As an optional embodiment, the second air storage device includes an artificial chamber, and the artificial chamber is in direct connection with the first air storage device in a penetrating manner or in connection with the first air storage device by means of a pipeline.

As an optional embodiment, two artificial chambers are provided, and depths of the two artificial chambers from the ground surface are different.

As an optional embodiment, the two artificial chambers include a first artificial chamber and a second artificial chamber provided below the first artificial chamber, and the volume of the first artificial chamber is greater than that of the second artificial chamber; the air compressor set and the air expander set both comprise a first pressure side and a second pressure side, the pressure on the first pressure side being less than the pressure on the second pressure side; the first artificial chamber is connected to the first pressure side of the air compressor set and the first pressure side of the air expander set; and the second artificial chamber is connected to the second pressure side of the air compressor set and the second pressure side of the air expander set.

As an optional embodiment, the air compressor set and the air expander set are coaxially connected by means of a three-in-one motor; the three-in-one motor comprises a second output shaft and a second input shaft, the second output shaft is connected to the air compressor by means of a second clutch, and the second input shaft is connected to the air expander set by means of a third clutch.

The motor generator and the three-in-one motor are both connected to the power grid in a controllable manner; the air compressor set is connected to the input end of the combined air storage device by means of an energy storage pipeline, and the air expander set is connected to the output end of the combined air storage device by means of an energy release pipeline.

As an optional embodiment, a buffer tank is further provided in the wind turbine generator compartment, the buffer tank is adapted to store air in a liquid state or in a super/trans-critical state, the buffer tank is in connection with the combined air storage device, an input end of the buffer tank is connected to the air compressor set, and an output end of the buffer tank is connected to the air expander set.

During energy storage, redundant electric energy is converted into mechanical energy by using a power grid load valley, and then is converted into pressure potential energy and heat energy of air, which are respectively stored in an air storage device and a heat storage sub-system. During energy release, the potential energy and the internal energy of the high-pressure and high-temperature air are converted into mechanical energy, and then are converted into electric energy to output peak clipping to the outside.

As an optional embodiment, a common heat exchange device is provided between the air compressor set and the air expander set, the common heat exchange device comprises a first heat exchange channel for circulating compressed air, a second heat exchange channel for circulating expanded air, and a third heat exchange channel for circulating a heat exchange working medium, the first heat exchange channel is connected to the energy storage pipeline, and the second heat exchange channel is connected to the energy release pipeline.

As an optional embodiment, a plurality of onshore wind turbine generator sets are provided, a plurality of second air storage devices are provided, and any number of first air storage devices are connected to any number of second air storage devices.

BRIEF DESCRIPTION OF THE DRAWINGS

To describe the technical solutions in the embodiments of the present invention or in the prior art more clearly, the accompanying drawings required for describing the embodiments or in the prior art are briefly introduced as follows. Obviously, the accompanying drawings in the following description show merely some embodiments of the present invention, and for a person of ordinary skill in the art, other drawings may also be obtained according to these drawings without any inventive effort.

DESCRIPTION OF REFERENCE NUMERALS

Figure 1:
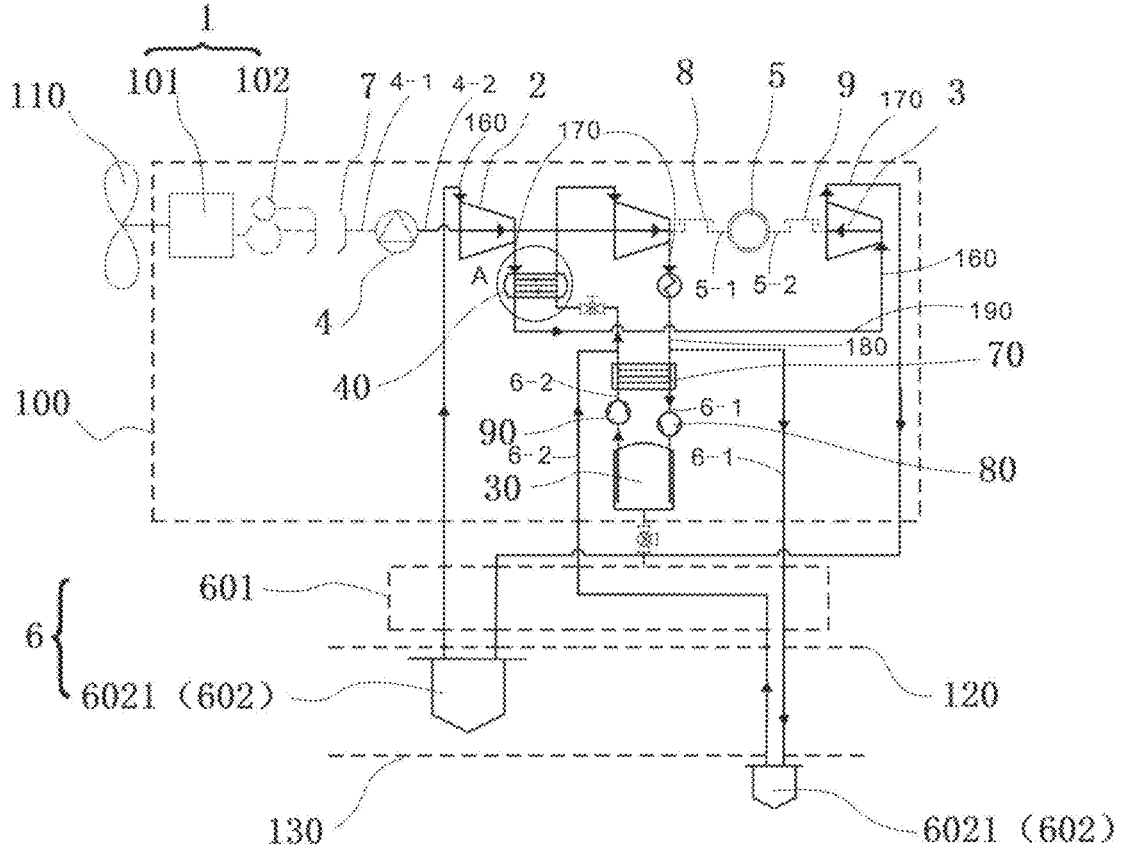
FIG. 1 is a schematic structural diagram of an onshore wind turbine generator set having a compressed energy storage system according to examples of the present invention.

1, wind turbine generator set; 101, main shaft; 102, gear box; 2, air compressor set; 3, air expander set; 4, motor generator; 5, three-in-one motor; 6, combined air storage device; 601, first air storage device; 602, second air storage device; 6021, artificial chamber; 60211, first artificial chamber; 60212, second artificial chamber; 7, first clutch; 8, second clutch; 9, third clutch; 10, tower barrel; 1001, tower barrel segment; 1002, outer barrel body; 1003, inner barrel body; 20, connecting pipe; 30, buffer tank; 40, common heat exchange device; 50, heat collection device; 60, cold storage device; 70, cold storage heat exchanger; 80: pressure decreasing device; 90; pressure increasing device; 100, wind turbine generator compartment; 110, blade; 120, ground surface; 130, deep ground; 140, cooler; 150, reheater; first input shaft, 4-1; first output shaft, 4-2; input end of the combined air storage device (6), 6-1; an output end of the combined air storage device (6), 6-2; cavity between the outer barrel body 1002 and the inner barrel body 1003, 200; first pressure side, 160; second pressure side, 170, second input shaft, 5-2; second output shaft, 5-1; energy storage pipeline, 180; energy release pipeline, 190.

DETAILED DESCRIPTION

To make the objectives, technical solutions, and advantages of the embodiments of the present invention clearer, the technical solutions of the embodiments of the present invention are clearly and completely described in the following with reference to the accompanying drawings in the embodiments of the present invention. Apparently, the described embodiments are a part rather than all of the embodiments of the present invention. All other embodiments obtained by a person skilled in the art based on the embodiments of the present invention without creative efforts shall belong to the scope of protection of the present invention.

The examples of the present invention are described as follows with reference to FIG. 1 to FIG. 7.

According to the examples of the present invention, the present invention provides an onshore wind turbine generator set having a compressed energy storage system, in which part of electromechanical apparatuses in the wind turbine generator set 1 and the compressed air energy storage system are into the wind turbine generator compartment 100, specifically including a wind turbine generator set 1, an air compressor set 2, an air expander set 3 and a motor generator 4 which are provided in a wind turbine generator compartment 100, and a combined air storage device 6 provided outside the wind turbine generator compartment 100; the motor generator 4 has a first input shaft and a first output shaft, the first input shaft is connected to the wind turbine generator set 1 by means of a first clutch 7, and the first output shaft is connected to the air compressor set 2; the combined air storage device 6 includes a first air storage device 601 provided in a tower barrel 10 and a second air storage device 602 provided underground, the inner cavity of the first air storage device 601 is in connection with the inner cavity of the second air storage device 602, an input end of the combined air storage device 6 is connected to the air compressor set 2, and an output end of the combined air storage device 6 is connected to the air expander set 3.

The onshore wind turbine generator set having a compressed energy storage system provided by the embodiments of the present invention has the following advantages:

1. an air compressor set 2 and an air expander set 3 of a compressed air energy storage system are directly embedded into a wind turbine generator compartment 100 of the onshore wind turbine generator set, so that the onshore wind turbine generator set and the compressed air energy storage system are directly coupled, the structure is compact, the occupied space is small, and construction costs of the onshore wind turbine generator set and the compressed air energy storage system are reduced. By optimizing the space inside the wind turbine generator compartment 100, the electromechanical devices of a compact micro-compressed air energy storage system can be built into the wind turbine generator compartment 100. The onshore wind turbine generator sets of different capacities can be adapted to a compact micro-compressed air energy storage system embedded into the wind turbine generator compartment 100 according to the energy storage ratio. The compact micro-compressed air energy storage system is directly embedded into a wind turbine generator compartment of an onshore wind turbine generator set, so as to solve the intermittent uncontrollability of land wind turbine grid connection, implementing distributed energy storage of renewable energy and a regional intelligent micro-grid, and reducing remote power transmission and distribution costs and construction costs of a compressed air energy storage system.

2. The air compressor set 2 and the wind turbine generator set are coupled by means of a motor generator 4 and a first clutch 7, the power supply of the motor generator 4 can be a power grid supply and may also be a power supply of a wind turbine generator set 1, so that a "source-grid-load-storage" connection mode is not only implemented by means of a "grid", and the compressed air energy storage system may be directly coupled to a wind power plant power supply at a source side nearby, implementing the distributed energy storage and regional micro-grid, and reducing the costs of power transmission and distribution. The air compressor set 2 is driven by a motor generator 4, and the motor generator 4 is powered by a grid power supply or a wind power plant power supply, and is implemented by controlling the on-off of a first clutch 7 depending on power grid requirements.

3. In a compressed air energy storage system, a first air storage device 601 is provided by means of combined air storage, i.e. by using a pipeline steel storage tank structure of a tower barrel 10 itself, a second air storage device 602 is provided on the land, and the first air storage device 601 is combined with the second air storage device 602 so as to improve the energy storage capacity and density after coupling. Compared with the traditional manner of using underground caverns, this manner is not limited by geographical conditions, shortening a power transmission distance, and reducing construction costs and power transmission costs. The air storage capacities of the first air storage device 601 and the second air storage device 602 can be rationally configured according to different energy storage requirements.

Specifically, referring to FIG. 1, the wind turbine generator set includes a main shaft 101 and a gear box 102. One end of the main shaft 101 is connected to a blade 110, the other end of the main shaft 101 is connected to the gear box 102, and an input shaft of the gear box 102 is connected to the motor generator 4 by means of the first clutch 7. Specifically, when the first clutch 7 is in a connected state, the motor generator 4 is connected to the gear box 102, and the power supply sent by the wind turbine generator set 1 directly drives the motor generator 4 to rotate, thereby driving the air compressor set 2 to operate. When the first clutch 7 is in a disconnected state, the motor generator 4 is disconnected from the gear box 102, and the motor generator 4 is driven by the power supply of the power grid, thereby driving the air compressor set 2 to operate.

Specifically, the wind turbine generator set 1 further includes an electric control system. The electric control devices of the air compressor set 2 and the air expander set 3 are electrically connected to the electric control system of the wind turbine generator set 1.

Specifically, the air compressor set 2 includes a multi-stage air compressor, and the air expander set 3 includes a multi-stage air expander.

Figure 2:
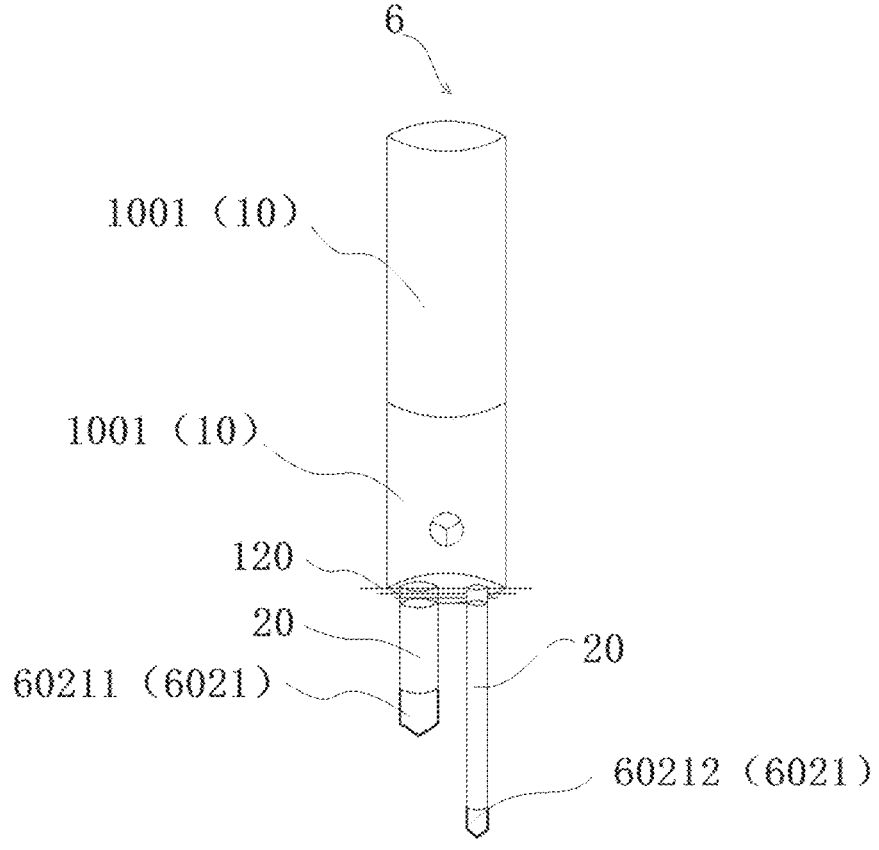
FIG. 2 is a schematic structural diagram of a first kind of combined air storage device in FIG. 1.
Figure 3:
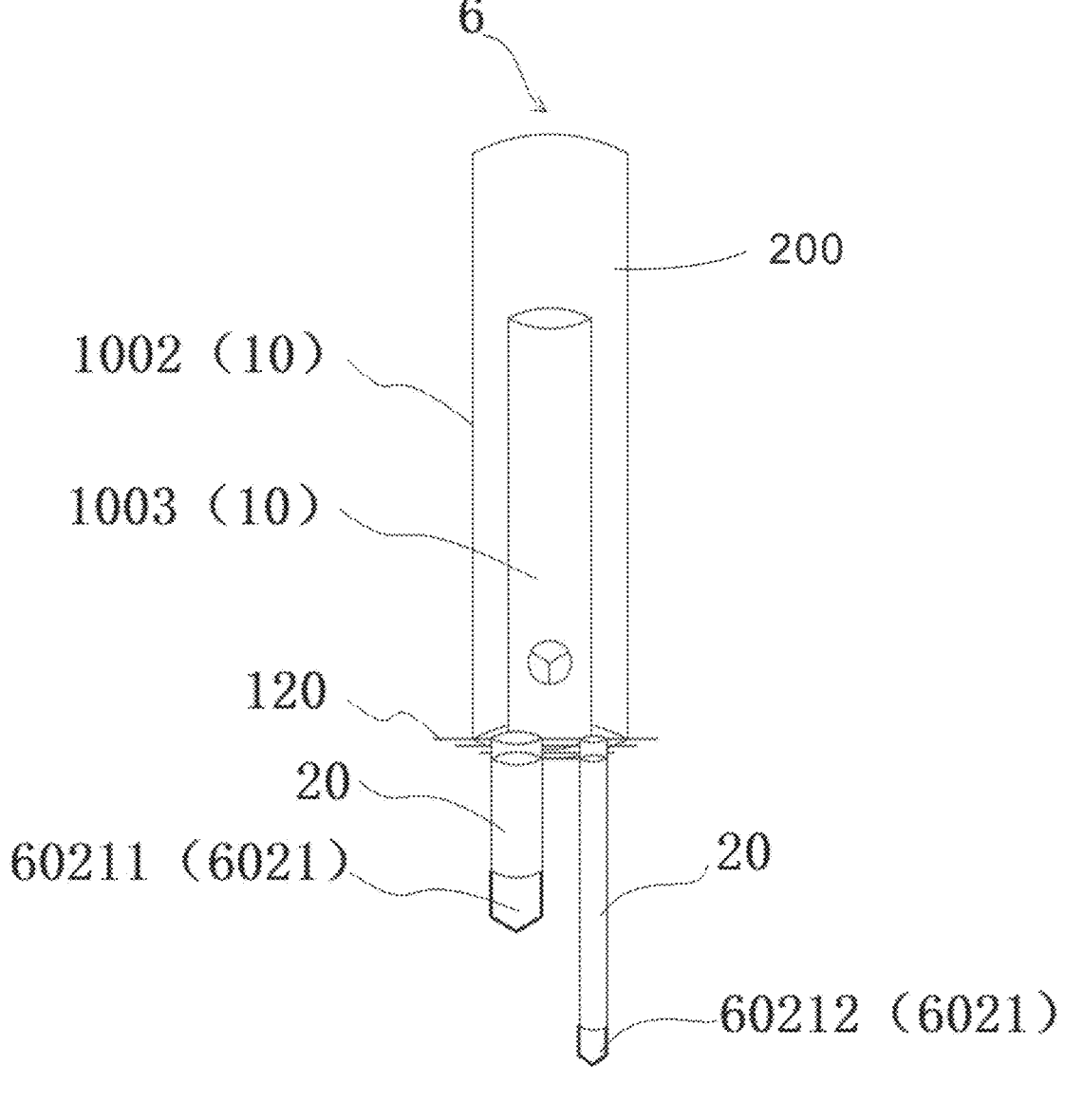
FIG. 3 is a schematic structural diagram of a second kind of combined air storage device in FIG. 1.
Figure 4:
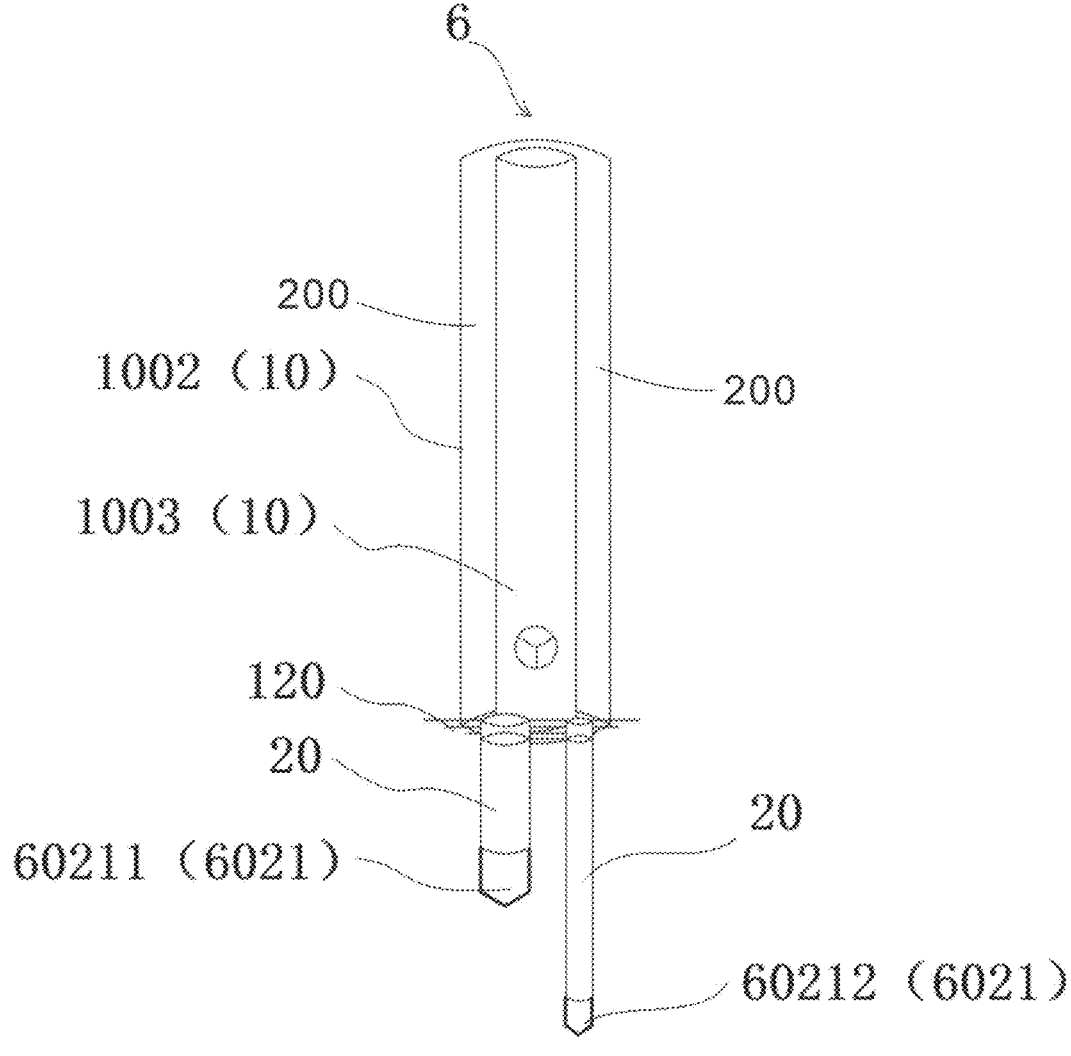
FIG. 4 is a schematic structural diagram of a third kind of combined air storage device in FIG. 1.

As an optional embodiment, referring to FIG. 2, the tower barrel 10 comprises a plurality of tower barrel segments 1001 connected in an axial direction, and the first air storage device 601 is provided in at least one of the tower barrel segments 1001, or the first air storage device 601 is at least one of the tower barrel segments 1001.

As the tower barrel 10 is a pipeline-like steel storage tank structure, by optimizing the inner space of the tower barrel 10, one or more tower barrel segments 1001 can be used as air storage tanks, and directly serve as a first air storage device 601, that is, the outer wall of the tower barrel 10 is the housing of the first air storage device 601, and the inner cavities of the tower barrel segments 1001 are the air storage cavity of the first air storage device 601. Certainly, the first air storage device 601 may also be placed in the inner cavities of the tower barrel segments 1001 in other forms. For example, the first air storage device 601 comprises an air storage barrel, and the air storage barrel is provided inside the tower barrel segments 1001 to store air.

As an optional embodiment, in an example, the tower barrel 10 comprises an outer barrel body 1002 and an inner barrel body 1003 which are sheathed, the first air storage device 601 is provided in a cavity between the outer barrel body 1002 and the inner barrel body 1003, or the cavity between the outer barrel body 1002 and the inner barrel body 1003 serves as the first air storage device 601. That is, referring to FIG. 3 and FIG. 4, the side walls of the outer barrel body 1002 and the inner barrel body 1003 of the tower barrel 10 form the housing of the first air storage device 601, and the cavity between the outer barrel body 1002 and the inner barrel body 1003 serves as the air storage cavity of the first air storage device 601. Certainly, the first air storage device 601 may also adopt other structures. For example, if the first air storage device 601 is an air storage barrel, the air storage barrel is provided between the outer barrel body 1002 and the inner barrel body 1003. The air storage capacity of the first air storage device 601 is adjusted adaptively according to the structure of the tower barrel 10.

As an optional embodiment, the second air storage device 602 includes an artificial chamber 6021, and the artificial chamber 6021 is in direct connection with the first air storage device 601 in a penetrating manner or in connection with the first air storage device by means of a pipeline.

Specifically, the artificial chamber 6021 comprises an artificial lining cavern or a concrete air storage chamber.

Compared with underground caverns, the use of an artificial chamber 6021 has a high air storage pressure, is not restricted by geographical conditions, does not rely on geographical conditions, and has a safe operation, high stability and relatively low costs. The quality of artificial lining caverns is superior to natural salt caverns or hard rock formations caverns, compared to salt caverns in subterranean caverns, the use of the artificial chamber 6021 has the following advantages: the site selection is more flexible, and air storage is performed based on the artificial chamber 6021, so that compressed air energy storage projects have broken away from the traditional reliance on salt caverns of salt cavern projects, greatly reducing the limitations on project site selection, and large-scale energy storage can be effectively linked with wind and solar resources. In addition, the artificial chamber 6021 also has advantages such as a higher upper pressure limit, a wider fluctuation available range, a higher system conversion efficiency, a shallower depth, and easy maintenance.

As an optional implementation, two artificial chambers 6021 are provided, and the depths of the two artificial chambers 6021 from the ground surface 120 are different. Specifically, referring to FIG. 2 to FIG. 4, three different structures of the tower barrel 10 are respectively connected to two artificial chambers 6021 by means of connecting pipes 20.

Because a ground temperature gradient exists below the ground surface, in a direction from a normal line of an underground isotherm surface to a center of the earth, an increment of the temperature in terms of distance per unit is 25-40° C./km, and temperature differences of different burial depths below the ground surface of a region with abundant geothermal energy are more obvious. Therefore, by providing the artificial chambers 6021 with two different depths, the geothermal heat can be utilized, and the utilization rate of the energy can be improved. The artificial chambers 6021 of which the coupling considers the ground temperature gradient, i.e. the dual underground air storage, can increase the compressed air storage capacity and density in a large proportion.

As an optional embodiment, the two artificial chambers 6021 include a first artificial chamber 60211 and a second artificial chamber 60212 provided below the first artificial chamber 60211, and the volume of the first artificial chamber 60211 is greater than that of the second artificial chamber 60212; the air compressor set 2 and the air expander set 3 both comprise a first pressure side and a second pressure side, the pressure on the first pressure side being less than the pressure on the second pressure side; the first artificial chamber 60211 is connected to the first pressure side of the air compressor set 2 and the first pressure side of the air expander set 3; and the second artificial chamber 60212 is connected to the second pressure side of the air compressor set 2 and the second pressure side of the air expander set 3. Specifically, the first artificial chamber 60211 is located below the ground surface 120, and the second artificial chamber 60212 is located in deep underground 130. The second artificial chamber 60212 away from the ground surface 120 in the second air storage device 602 has a small space and a high pressure, can absorb a large amount of geothermal energy, and has a high temperature, so as to store the excess exhaust gas of the compressor set, and jointly push the turbine to generate power during energy release. The first artificial chamber 60211 near the ground surface 120 in the second air storage device 602 has a large space and a low pressure, can absorb less heat energy, and has a low temperature, so as to store the excess exhaust gas of the air expander set, and to jointly supply air to the air compressor set during energy storage.

By using the combined air storage device 6, the ratio of the combined air storage is flexible, and the air storage ratio of the first air storage device 601 and the second air storage device 602 can be reasonably allocated according to the wind site selection, the geological condition, the capacity of the wind turbine generator set 1 and the air storage space required by the compressed air energy storage.

As an optional embodiment, the air compressor set 2 and the air expander set 3 are coaxially connected by means of a three-in-one motor 5; the three-in-one motor 5 comprises a second output shaft and a second input shaft, the second output shaft is connected to the air compressor set 2 by means of a second clutch 8, and the second input shaft is connected to the air expander set 3 by means of a third clutch 9.

The motor generator 4 and the three-in-one motor 5 are both electrically connected to the power grid in a controllable manner; the air compressor set 2 is connected to an input end of the combined air storage device 6 by means of an energy storage pipeline; and the air expander set 3 is connected to an output end of the combined air storage device 6 by means of an energy release pipeline By means of such an arrangement, on the one hand, the electromechanical conversion loss caused by a multi-axis connection can be reduced, thereby improving the energy conversion efficiency; on the other hand, the described connection is beneficial to improving the level of system integration and the space utilization rate, thereby saving construction and operational and maintenance costs, and achieving the effect of decreasing the costs and increasing the efficiency. The three-in-one motor 5 is connected to the air compressor set 2 by means of a second clutch 8, and can be used as a motor to drive the air compressor set 2 to compress air; or is connected to the air expander set 3 by means of a third clutch 9, and is used as a generator to drive the air expander set 3 to expand and generate power; or as a phase modifier to increase a reactive output when a grid voltage decreases, and absorb the reactive power when the grid voltage increases, thereby maintaining the grid voltage, improving the stability of a system, and improving the power supply quality of the system. By using a clutch in cooperation with the combination of three machines, i.e. a generator, a motor and a phase modifier, costs of mechanical devices and electrical devices can be greatly reduced. The specific coaxial compact arrangement manner is flexible, and the positions and the number of the shared mechanical apparatuses and electrical apparatuses can be determined according to the power and the rotation speed of each segment of the air compressor set 2 and the air expander set 3.

With regard to the operation of the three-in-one motor 5, specifically, when the second clutch 8 is in a connected state and the third clutch 9 is in a disconnected state, the second output shaft of the three-in-one motor 5 is connected to the air compressor set 2, which can drive the air compressor set 2 to operate, and at this time, an air compression and energy storage process is performed. When the second clutch 8 is in a disconnected state and the third clutch 9 is in a connected state, the second input shaft of the three-in-one motor 5 is connected to the air expander set 3, which can drive the air expander set 3 to operate to generate power, and at this time, a process of air expansion and energy release, and power generation is performed.

As an optional embodiment, a buffer tank 30 is further provided in the wind turbine generator compartment 100, the buffer tank 30 is adapted to store air in a liquid state or in a super/trans-critical state, the buffer tank 30 is in connection with the combined air storage device 6, an input end of the buffer tank 30 is connected to the air compressor set 2, and an output end of the buffer tank 30 is connected to the air expander set 3.

The buffer tank 30 can be provided for compression storage of air in a liquid or super/trans-critical state. By storing compressed air in a liquid state or a super/trans-critical state, the system efficiency can be significantly improved; and the specific air storage state of the compressed energy storage system can be flexibly selected according to the power and duration of the stored electrical energy required by the wind power plant or the off-peak electricity.

In one example, referring to FIG. 1, the buffer tank 30 is integrated within the wind turbine generator compartment 100. By means of this arrangement, the space in the wind turbine generator compartment 100 can be fully utilized, and more electromechanical devices in the compressed air energy storage system are integrated in the wind turbine generator compartment 100, thereby reducing the space occupied by the electromechanical devices.

Specifically, during energy storage, the air compressor set 2 is driven to operate by using electric energy rich in an onshore wind power plant or electric energy of a power grid, and the low-pressure air is compressed to a liquid state or a super/trans-critical state according to the power and duration for storing the electric energy, and is stored in the combined air storage device 6, i.e. stored in the first air storage device 601 and/or the second air storage device 602.

During energy release, the compressed air in the combined air storage device 6 is outputted to the air expander set 3 for expansion to generate power.

As an optional embodiment, a common heat exchange device 40 is provided between the air compressor set 2 and the air expander set 3, the common heat exchange device 40 comprises a first heat exchange channel for circulating compressed air, a second heat exchange channel for circulating expanded air, and a third heat exchange channel for circulating a heat exchange working medium, the first heat exchange channel is connected to the energy storage pipeline, and the second heat exchange channel is connected to the energy release pipeline.

Specifically, the heat exchange devices with a small temperature difference and a small pressure difference on the energy storage pipeline and the energy release pipeline are both used to reduce the costs of the energy storage and heat exchange sub-system. The configurations of the air compressor set 2 and the air expander set 3 are different in different application scenarios, and the positions and the number of the common heat exchange devices may be arranged according to the temperature difference and the pressure difference of the matched heat exchangers.

Figure 5:
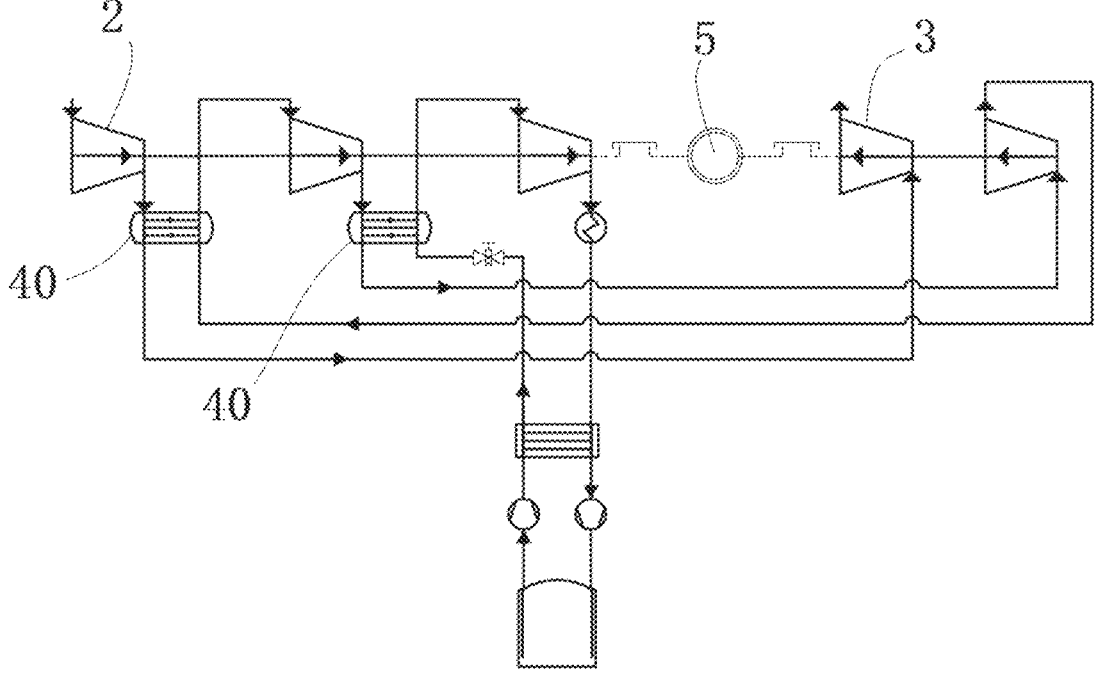
FIG. 5 is a first schematic structural diagram of an air compressor set and an air expander set in connection with a common heat exchange device according to the examples of the present invention.

Specifically, the air compressor set 2 and the air expander set 3 both include a first pressure side and a second pressure side, and the pressure on the first pressure side is lower than the pressure on the second pressure side, that is, the first pressure side is a low pressure side, and the second pressure side is a high pressure side. As one example, the air compressor set 2 and the air expander set 3 on the first pressure side and the second pressure side are both connected to the common heat exchange device 40, that is, the air compressor set 2 and the air expander set 3 share a heat exchange device no matter on the low pressure side or the high pressure side, as shown in FIG. 5. Specifically, in this example, there are two common heat exchange devices 40 which respectively provided at the first pressure side and the second pressure side, that is, an air compressor on the low pressure side and an air expander on the low pressure side are connected to a common heat exchange device 40 at the first pressure side in a heat exchange manner, and an air compressor on the high pressure side and an air expander on the high pressure side are connected to a common heat exchange device 40 on the second pressure side in a heat exchange manner. Of course, a plurality of common heat exchange devices 40 may also be provided and are correspondingly connected to air compressors and air expanders of different pressure levels. By sharing the common heat exchange device 40 by the air compressor set 2 and the air expander set 3, the investment and construction costs of the heat exchange system are reduced.

Figure 6:
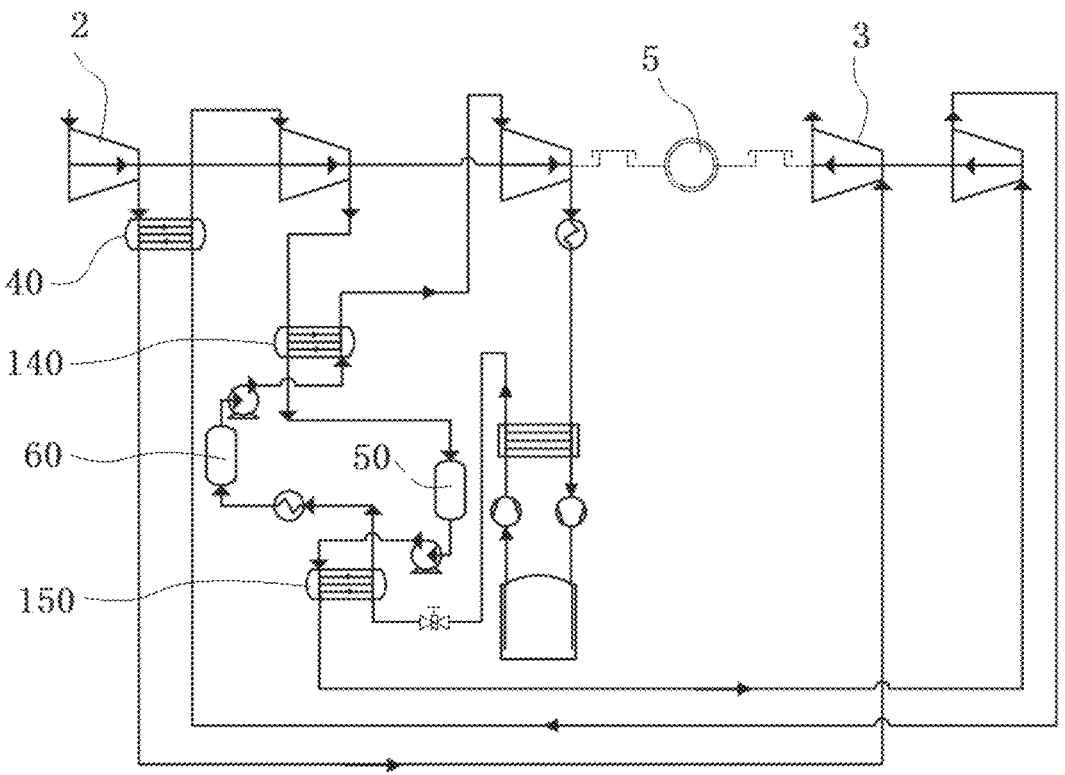
FIG. 6 is a second schematic structural diagram of the air compressor set and the air expander set in connection with the common heat exchange device according to the examples of the present invention.

In some examples, with reference to FIG. 6, the common heat exchange device 40 is provided only on the first pressure side. That is, the air compressor on the low pressure side and the air expander on the low pressure side share the common heat exchange device 40. Temperature parameters of the common heat exchange device 40 on the low pressure side are close to each other, and as the pressure difference is small, the number and tonnage of heat exchange devices can be reduced after sharing the common heat exchange device 40.

Figure 7:
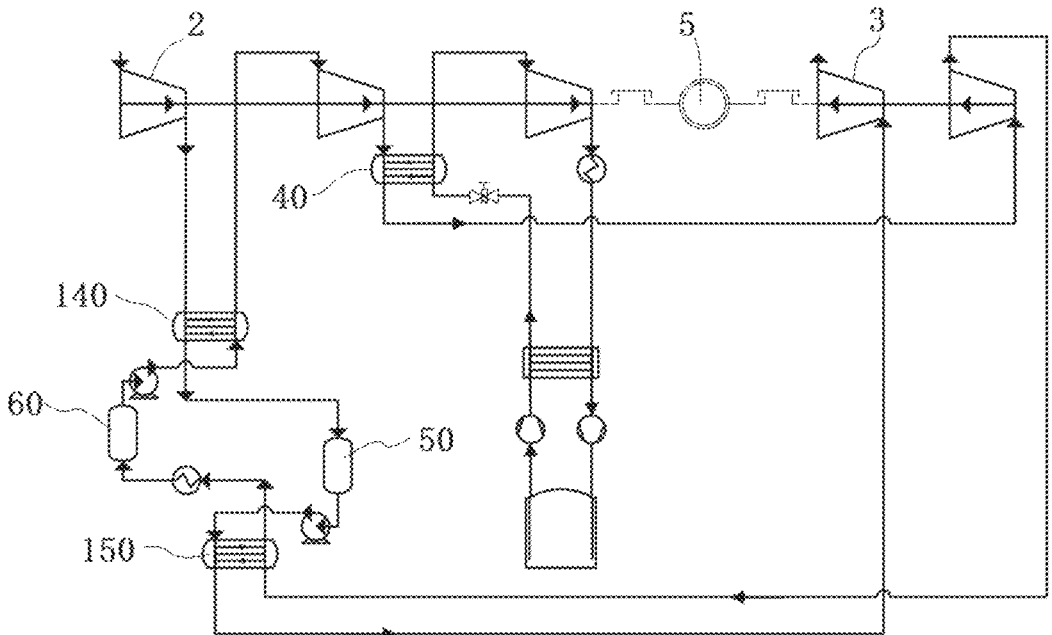
FIG. 7 is a third schematic structural diagram of the air compressor set and the air expander set in connection with the common heat exchange device according to the examples of the present invention.
Figure 8:
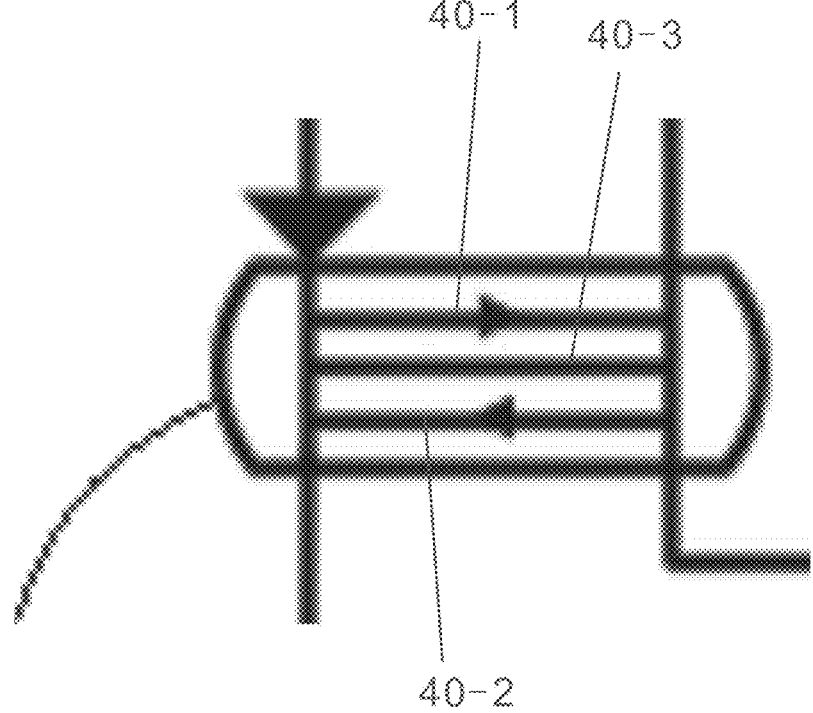
FIG. 8 is an enlarged view at A of FIG. 1.

In some examples, referring to FIG. 7, the common heat exchange device 40 is provided only at the second pressure side. That is, the air compressor on the high pressure side and the air expander on the high pressure side share the common heat exchange device 40. As the temperature parameters of the common heat exchange device 40 on the high pressure side are close to each other, and the pressure difference is large, when the first heat exchange channel and the second heat exchange channel are switched to operate, the pressure change needs to be considered, and after the common heat exchange device 40 is shared, the number and tonnage of the heat exchange devices can be obviously reduced.

In some examples, referring to FIG. 6 or FIG. 7, a cooler 140 is connected between adjacent air compressors, and a reheater 150 is connected between adjacent air expanders. When the air compressor and the air expander share the common heat exchange device 40, the cooler 140 and the reheater 150 of the corresponding level are omitted. During energy storage, the air is cooled by the common heat exchange device 40, and during energy release, the air is heated by the common heat exchange device 40.

In some examples, with reference to FIG. 6 or FIG. 7, a heat collection device 50 and a cold storage device 60 are connected between the cooler 140 and the reheater 150. The cooler 140 is used for cooling air in the energy storage process, and the replaced heat is stored in the heat collection device 50, and can be used for heating air in the energy release process. The reheater 150 is used for heating the air during the energy release process, and the replaced cold is stored in the cold storage device 60, and can be used for reducing the temperature of the air during the energy storage process, so as to achieve the recycling of the heat.

In some examples, referring to FIG. 6 or FIG. 7, a pressure decreasing device 80 is connected between the output end of the air compressor set 2 and the input end of the buffer tank 30, and is used for reducing the pressure of compressed air during the energy storage process, and the compressed air is stored in the combined air storage device 6 by means of the buffer tank 30. Specifically, the pressure decreasing device 80 comprises a liquid expander or throttle valve.

In some examples, referring to FIG. 6 or FIG. 7, a pressure increasing device 90 is connected between the input end of the air expander set 3 and the output end of the buffer tank 30. During the energy release process, the compressed air stored in the combined air storage device 6 is outputted to the buffer tank 30, pressurized by the pressure increasing device 90, and then inputted into the air expander set 3. In particular, the pressure increasing device 90 comprises a pressure increasing pump, in particular a cryogenic pump.

In some examples, with reference to FIG. 1, FIG. 6 or FIG. 7, the compressed air energy storage system further includes a cold storage heat exchanger 70, and the cold storage heat exchanger 70 includes a first channel through which compressed air flows during the energy storage process, a second channel through which expanded air flows during the energy release process, and a third channel through which a heat exchange medium flows. During the energy storage process, the cold energy stored in the cold storage heat exchanger 70 is used to perform pressure cooling and liquidation on the compressed air, and then the compressed air is stored in the combined air storage device 6 at a normal pressure after the pressure thereof is reduced by the pressure decreasing device 80. During the energy release process, the cold storage heat exchanger 70 is used for heating air to a normal temperature.

Working Principle

I. During energy storage, the multi-stage air compressor is driven by using electric energy rich in an onshore wind power plant or electric energy of a power grid, the low-pressure air is compressed to a liquid state or a super/trans-critical state according to the power and duration for storing the electric energy, after being cooled to normal temperature by the common heat exchange device 40, equal-pressure cooling and liquidation is performed on the compressed air by using the cold energy stored in the cold storage heat exchanger 70, and after the pressure thereof is decreased by the pressure decreasing device 80, the compressed air is stored in the combined air storage device 6 at a normal pressure. The second artificial chamber 60212 away from the ground surface 120 in the second air storage device 602 has a small space and a high pressure, can absorb a large amount of geothermal energy, and has a high temperature, so as to store the excess exhaust gas of the compressor set, and jointly push the turbine to generate power during energy release.

II. During energy release, the air in a liquid or super/trans-critical state in the combined air storage device 6 is pressurized, and then is heated to a normal temperature by the cold storage heat exchanger 70, the compression heat in the common heat exchange device 40 is absorbed, and finally the air is expanded by the multi-stage air expander to generate power to the outside. The first artificial chamber 60211 near the ground surface 120 in the second air storage device 602 has a large space and a low pressure, can absorb less heat energy, and has a low temperature, so as to store the excess exhaust gas of the air expander set 3, and to jointly supply air to the air compressor set 2 during energy storage.

As an optional embodiment, a plurality of onshore wind turbine generator sets are provided, a plurality of second air storage devices 602 are provided, and any number of first air storage devices 601 are connected to any number of second air storage devices 602. That is, one first air storage device 601 may be connected to a plurality of second air storage devices 602, or a plurality of first air storage devices 601 may also be connected to one second air storage device 602, or a plurality of first air storage devices 601 may also be correspondingly connected to a plurality of second air storage devices 602 in one-to-one correspondence.

According to the compressed energy storage system provided in the present invention, the energy density of compressed air is improved by means of natural thermal energy supplement, a low-cost air storage device of a compressed air energy storage system adapted to the capacity of an onshore wind turbine uses a joint proportion method, mechanical apparatuses and electrical apparatuses use a coaxial compact arrangement method, a low-cost heat exchange system uses a heat exchanger sharing method, and these apparatuses are directly embedded in an onshore wind turbine generator set compartment to couple a wind power plant at a source side.

In addition, the present invention does not require a separate filter, thereby saving the space of the apparatuses in the wind turbine generator compartment 100, and the air working medium can achieve internal circulation, thereby effectively avoiding the influence of sand dust particles in the application scenarios of desert, gobi and harsh desert.

Although the examples of the present invention are described with reference to the accompanying drawings, various modifications and variations can be made by those skilled in the art without departing from the spirit and scope of the present invention, and all such modifications and variations belong to the scope of the present invention as defined by the appended claims.

What is claimed is:

1. An onshore wind turbine generator set having a compressed energy storage system, comprising a wind turbine generator set (1), an air compressor set (2), an air expander set (3) and a motor generator (4) which are provided in a wind turbine generator compartment (100), and a combined air storage device (6) provided outside the wind turbine generator compartment (100), wherein the motor generator (4) has a first input shaft and a first output shaft, the first input shaft is connected to the wind turbine generator set (1) by means of a first clutch (7), and the first output shaft is connected to the air compressor set (2); and the combined air storage device (6) comprises a first air storage device (601) provided in a tower barrel (10) and a second air storage device (602) provided underground, the inner cavity of the first air storage device (601) is in connection with the inner cavity of the second air storage device (602), an input end (6-1) of the combined air storage device (6) is connected to the air compressor set (2), and an output end (6-2) of the combined air storage device (6) is connected to the air expander set (3).

2. The onshore wind turbine generator set having the compressed energy storage system according to claim 1, wherein the tower barrel (10) comprises a plurality of tower barrel segments (1001) connected in an axial direction, the first air storage device (601) is provided in at least one of the tower barrel segments (1001), or the first air storage device (601) is at least one of the tower barrel segments (1001);

or the tower barrel (10) comprises an outer barrel body (1002) and an inner barrel body (1003) which are sheathed, the first air storage device (601) is provided in a cavity between the outer barrel body (1002) and the inner barrel body (1003), or the cavity between the outer barrel body (1002) and the inner barrel body (1003) serves as the first air storage device (601).

3. The onshore wind turbine generator set having the compressed energy storage system according to claim 2, wherein the second air storage device (602) comprises at least one artificial chamber (6021), and the artificial chamber (6021) is directly in connection with the first air storage device (601) in a direct penetrating manner or in connection with the first air storage device (601) by means of a pipeline.

4. The onshore wind turbine generator set having the compressed energy storage system according to claim 3, wherein the second air storage device (602) comprises two artificial chambers (6021), and the two artificial chambers (6021) have different depths from the ground surface (120).

5. The onshore wind turbine generator set having the compressed energy storage system according to claim 4, wherein the two artificial chambers (6021) comprise a first artificial chamber (60211) and a second artificial chamber (60212) provided below the first artificial chamber (60211), the volume of the first artificial chamber (60211) being greater than the volume of the second artificial chamber (60212); the air compressor set (2) and the air expander set (3) both comprise a first pressure side and a second pressure side, the pressure on the first pressure side being less than the pressure on the second pressure side; the first artificial chamber (60211) is connected to the first pressure side of the air compressor set (2) and the first pressure side of the air expander set (3); and the second artificial chamber (60212) is connected to the second pressure side of the air compressor set (2) and the second pressure side of the air expander set (3).

6. The onshore wind turbine generator set having the compressed energy storage system according to claim 2, wherein the air compressor set (2) is coaxially connected to the air expander set (3) by means of a motor (5); and the motor (5) comprises a second output shaft and a second input shaft, the second output shaft is connected to the air compressor set (2) by means of a second clutch (8), the second input shaft is connected to the air expander set (3) by means of a third clutch (9), the air compressor set (2) is connected to an input end of the combined air storage device (6) by means of an energy storage pipeline, and the air expander set (3) is connected to an output end of the combined air storage device (6) by means of an energy release pipeline.

7. The onshore wind turbine generator set having the compressed energy storage system according to claim 6, wherein a common heat exchange device (40) is provided between the air compressor set (2) and the air expander set (3), the common heat exchange device (40) comprises a first heat exchange channel for circulating compressed air, a second heat exchange channel for circulating expanded air, and a third heat exchange channel, the first heat exchange channel is connected to the energy storage pipeline, and the second heat exchange channel is connected to the energy release pipeline.

8. The onshore wind turbine generator set having the compressed energy storage system according to claim 7, wherein a plurality of onshore wind turbine generator sets are provided, a plurality of second air storage devices (602) are provided, and any number of first air storage devices (601) are connected to any number of second air storage devices (602).

9. The onshore wind turbine generator set having the compressed energy storage system according to claim 2, wherein a buffer tank (30) is further provided in the wind turbine generator compartment (100), and the buffer tank (30) is adapted to store air in a liquid state or in a super/trans-critical state, and the buffer tank (30) is in connection with the combined air storage device (6), an input end of the buffer tank (30) is connected to the air compressor set (2), and an output end of the buffer tank (30) is connected to the air expander set (3).

10. The onshore wind turbine generator set having the compressed energy storage system according to claim 1, wherein the second air storage device (602) comprises at least one artificial chamber (6021), and the artificial chamber (6021) is directly in connection with the first air storage device (601) in a direct penetrating manner or in connection with the first air storage device (601) by means of a pipeline.

11. The onshore wind turbine generator set having the compressed energy storage system according to claim 10, wherein the second air storage device (602) comprises two artificial chambers (6021), and the two artificial chambers (6021) have different depths from the ground surface (120).

12. The onshore wind turbine generator set having the compressed energy storage system according to claim 11, wherein the two artificial chambers (6021) comprise a first artificial chamber (60211) and a second artificial chamber (60212) provided below the first artificial chamber (60211), the volume of the first artificial chamber (60211) being greater than the volume of the second artificial chamber (60212); the air compressor set (2) and the air expander set (3) both comprise a first pressure side and a second pressure side, the pressure on the first pressure side being less than the pressure on the second pressure side; the first artificial chamber (60211) is connected to the first pressure side of the air compressor set (2) and the first pressure side of the air expander set (3); and the second artificial chamber (60212) is connected to the second pressure side of the air compressor set (2) and the second pressure side of the air expander set (3).

13. The onshore wind turbine generator set having the compressed energy storage system according to claim 1, wherein the air compressor set (2) is coaxially connected to the air expander set (3) by means of a motor (5); and the motor (5) comprises a second output shaft and a second input shaft, the second output shaft is connected to the air compressor set (2) by means of a second clutch (8), the second input shaft is connected to the air expander set (3) by means of a third clutch (9), the air compressor set (2) is connected to an input end of the combined air storage device (6) by means of an energy storage pipeline, and the air expander set (3) is connected to an output end of the combined air storage device (6) by means of an energy release pipeline.

14. The onshore wind turbine generator set having the compressed energy storage system according to claim 13, wherein a common heat exchange device (40) is provided between the air compressor set (2) and the air expander set (3), the common heat exchange device (40) comprises a first heat exchange channel for circulating compressed air, a second heat exchange channel for circulating expanded air, and a third heat exchange channel, the first heat exchange channel is connected to the energy storage pipeline, and the second heat exchange channel is connected to the energy release pipeline.

15. The onshore wind turbine generator set having the compressed energy storage system according to claim 14, wherein a plurality of onshore wind turbine generator sets are provided, a plurality of second air storage devices (602) are provided, and any number of first air storage devices (601) are connected to any number of second air storage devices (602).

16. The onshore wind turbine generator set having the compressed energy storage system according to claim 1, wherein a buffer tank (30) is further provided in the wind turbine generator compartment (100), and the buffer tank (30) is adapted to store air in a liquid state or in a super/trans-critical state; and the buffer tank (30) is in connection with the combined air storage device (6), an input end of the buffer tank (30) is connected to the air compressor set (2), and an output end of the buffer tank (30) is connected to the air expander set (3).

\* \* \* \* \*